United States Patent
Carson et al.

(10) Patent No.: US 12,403,423 B2
(45) Date of Patent: Sep. 2, 2025

(54) SYSTEMS AND METHODS OF RENEWABLE NATURAL GAS PROCESSING

(71) Applicant: Alchemy CO2, PBC, Atlanta, GA (US)

(72) Inventors: Christopher S. Carson, Bussum (NL); Noah A. Leinwand, New York, NY (US); Casey J. Leist, Atlanta, GA (US)

(73) Assignee: Alchemy CO2, PBC, Atlanta, GA (US)

( * ) Notice: Subject to any disclaimer, the term of this patent is extended or adjusted under 35 U.S.C. 154(b) by 0 days.

(21) Appl. No.: 19/046,317

(22) Filed: Feb. 5, 2025

(65) Prior Publication Data
US 2025/0177910 A1    Jun. 5, 2025

Related U.S. Application Data (63) Continuation of application No. PCT/US2024/033071, filed on Jun. 7, 2024.
(Continued)

(51) Int. Cl.
| | | |
|---|---|---|
| *B01D 53/22* | (2006.01) | |
| *B01D 53/00* | (2006.01) | |
| *B01D 53/04* | (2006.01) | |

(52) U.S. Cl.
CPC ......... *B01D 53/226* (2013.01); *B01D 53/002* (2013.01); *B01D 53/04* (2013.01);
(Continued)

(58) Field of Classification Search
None
See application file for complete search history.

(56) References Cited

U.S. PATENT DOCUMENTS

| | | |
|---|---|---|
| 4,374,657 A | 2/1983 | Schendel et al. |
| 4,602,477 A | 7/1986 | Lucadamo |
| | (Continued) | |

FOREIGN PATENT DOCUMENTS

| | | |
|---|---|---|
| CN | 107758664 A | 3/2018 |
| WO | WO-2022055125 A1 * | 3/2022 |
| | (Continued) | |

OTHER PUBLICATIONS

WO2022055125A1_Eng (Espacenet machine translation of Chang) (Year: 2022).*
(Continued)

*Primary Examiner* — Gabriel E Gitman
(74) *Attorney, Agent, or Firm* — GTC Law Group PC & Affiliates (57) ABSTRACT

Example gas recovery systems include a source gas conditioning assembly configured to condition and compress the inlet source gas to provide a conditioned source gas, a first membrane assembly configured to separate the conditioned source gas into a hydrocarbon enriched stream and a recovery stream, a second membrane assembly fluidly coupled to the hydrocarbon enriched stream, and configured to separate the hydrocarbon enriched stream into a hydrocarbon product stream and a recycle stream, a carbon dioxide ($CO_2$) plant assembly fluidly coupled to the recovery stream configured to provide a carbon dioxide product stream and an enriched recycle stream, a standalone membrane assembly configured to separate the enriched recycle stream into a hydrocarbon enriched recycle stream and an effluent stream, and wherein the source gas conditioning assembly is fluidly coupled to the recycle stream and the hydrocarbon enriched recycle stream.

6 Claims, 9 Drawing Sheets

Related U.S. Application Data (60) Provisional application No. 63/545,070, filed on Oct. 20, 2023, provisional application No. 63/471,630, filed on Jun. 7, 2023, provisional application No. 63/471,626, filed on Jun. 7, 2023, provisional application No. 63/471,625, filed on Jun. 7, 2023, provisional application No. 63/471,624, filed on Jun. 7, 2023.

(52) U.S. Cl.
CPC ...... *B01D 53/229* (2013.01); *B01D 2053/221* (2013.01); *B01D 2256/22* (2013.01); *B01D 2256/24* (2013.01); *B01D 2256/245* (2013.01); *B01D 2257/504* (2013.01); *B01D 2258/05* (2013.01); *B01D 2311/14* (2013.01); *C10L 2290/10* (2013.01); *C10L 2290/548* (2013.01); *F25J 2210/66* (2013.01); *Y02C 20/40* (2020.08)

(56) References Cited

U.S. PATENT DOCUMENTS

| | | | |
|---|---|---|---|
| 4,639,257 A | 1/1987 | Duckett et al. | |
| 4,659,343 A | 4/1987 | Kelly | |
| 4,701,187 A | 10/1987 | Choe et al. | |
| 4,772,295 A | 9/1988 | Shibuya et al. | |
| 4,936,887 A | 6/1990 | Waldo et al. | |
| 5,089,034 A | 2/1992 | Markovs et al. | |
| 5,727,903 A | 3/1998 | Borray et al. | |
| 6,128,919 A | 10/2000 | Daus et al. | |
| 6,572,679 B2 | 6/2003 | Baker et al. | |
| 6,610,124 B1 | 8/2003 | Dolan et al. | |
| 6,630,011 B1 | 10/2003 | Baker et al. | |
| 8,999,038 B2 | 4/2015 | Ungerank et al. | |
| 11,980,846 B1 | 5/2024 | Bikson | |
| 12,139,681 B1 | 11/2024 | Bikson | |
| 12,139,682 B1 | 11/2024 | Bikson | |
| 2004/0018144 A1 | 1/2004 | Briscoe | |
| 2004/0099138 A1 | 5/2004 | Karode et al. | |
| 2004/0103782 A1 | 6/2004 | Wascheck et al. | |
| 2007/0166205 A1 | 7/2007 | Holst et al. | |
| 2007/0243127 A1 | 10/2007 | Fedorov et al. | |
| 2009/0165377 A1 | 7/2009 | Koh et al. | |
| 2010/0256245 A1 | 10/2010 | Iaccino et al. | |
| 2011/0094378 A1 | 4/2011 | Mitariten | |
| 2012/0121497 A1 | 5/2012 | Terrien et al. | |
| 2012/0180389 A1 | 7/2012 | Knaebel | |
| 2012/0291483 A1 | 11/2012 | Terrien et al. | |
| 2012/0292574 A1 | 11/2012 | Terrien et al. | |
| 2013/0131199 A1 | 5/2013 | Lien et al. | |
| 2013/0142720 A1 | 6/2013 | Chen et al. | |
| 2015/0122122 A1 | 5/2015 | W Mustapa et al. | |
| 2015/0323248 A1* | 11/2015 | Terrien ............... | F25J 3/0223 62/619 |
| 2015/0360165 A1 | 12/2015 | Carson et al. | |
| 2016/0001219 A1 | 1/2016 | Ho et al. | |
| 2017/0283292 A1* | 10/2017 | Kim .................. | B01D 53/226 |
| 2018/0133643 A1 | 5/2018 | Ho et al. | |
| 2018/0250627 A1 | 9/2018 | Zick et al. | |
| 2019/0030482 A1 | 1/2019 | Ding et al. | |
| 2019/0060835 A1 | 2/2019 | Ding et al. | |
| 2020/0203738 A1 | 6/2020 | Jolly et al. | |
| 2020/0307997 A1 | 10/2020 | Tranier | |
| 2023/0119784 A1 | 4/2023 | Reinertsen et al. | |
| 2024/0019205 A1* | 1/2024 | Prince ............... | F25J 3/0257 |
| 2025/0035376 A1* | 1/2025 | Valentin ............. | F25J 3/0252 |
| 2025/0066272 A1 | 2/2025 | O'brien et al. | |

FOREIGN PATENT DOCUMENTS

| | | |
|---|---|---|
| WO | 2024254496 A2 | 12/2024 |
| WO | 2024254503 A2 | 12/2024 |
| WO | 2024254510 A2 | 12/2024 |
| WO | 2024254496 A3 | 4/2025 |
| WO | 2024254503 A3 | 4/2025 |
| WO | 2024254510 A3 | 4/2025 |

OTHER PUBLICATIONS

PCT/US2024/033071, "International Application Serial No. PCT/US2024/033071, International Search Report and Written Opinion mailed Nov. 27, 2024", Alchemy CO2, PBC, 34 pages.

PCT/US2024/033071, "International Application Serial No. PCT/US2024/033071, Invitation to Pay Additional Fees and, Where Applicable, Protest Fee mailed Sep. 12, 2024", Alchemy CO2, PBC, 3 pages.

PCT/US2024/033079, "International Application Serial No. PCT/US2024/033079, International Search Report and Written Opinion mailed Nov. 5, 2024", Alchemy CO2, PBC, 19 pages.

PCT/US2024/033079, "International Application Serial No. PCT/US2024/033079, Invitation to Pay Additional Fees and, Where Applicable, Protest Fee mailed Sep. 10, 2024", Alchemy CO2, PBC, 3 pages.

PCT/US2024/033087, "International Application Serial No. PCT/US2024/033087, International Search Report and Written Opinion mailed Nov. 27, 2024", Alchemy CO2, PBC, 25 pages.

PCT/US2024/033087, "International Application Serial No. PCT/US2024/033087, Invitation to Pay Additional Fees and, Where Applicable, Protest Fee mailed Sep. 10, 2024", Alchemy CO2, PBC, 3 pages.

\* cited by examiner

SYSTEMS AND METHODS OF RENEWABLE NATURAL GAS PROCESSING

CLAIM TO PRIORITY

This application is a continuation of PCT International Patent Application Serial Number PCT/US2024/033071 (ACO2-0001-WO), filed on Jun. 7, 2024, which is incorporated by reference herein for all purposes.

PCT/US2024/033071 relates to, incorporates by reference for all purposes, and claims priority to United States Application Ser. Nos. 63/471,624 filed Jun. 7, 2023 (2112.0003), 63/471,625 filed Jun. 7, 2023 (2112.0004), 63/471,626 filed Jun. 7, 2023 (2112.0005), 63/471,630 filed Jun. 7, 2023 (2112.0007), and 63/545,070 filed Oct. 20, 2023 (2112.0009).

BACKGROUND

Presently known gas recovery systems suffer from a number of challenges. For example, recovery gas streams, such as landfill gas, have a number of constituents that are not primary natural gas constituents (e.g., methane). Accordingly, those constituents lead to excessive energy utilization to maintain high recycle rates, a significant portion of pumping energy committed to recycling non-valuable gas constituents, loss of hydrocarbon product gas to purge streams, or the like.

SUMMARY

Example embodiments of the present disclosure provide for systems capable to perform essentially 100% recovery of a primary product (e.g., natural gas or methane) and a secondary product (e.g., $CO_2$), from a gas source such as landfill gas and/or a biogas. Example embodiments of the present disclosure provide for gas compression costs and recycle rates for a membrane based gas recovery system. Example embodiments of the present disclosure utilize residual pressure from a $CO_2$ plant to operate a standalone membrane, and/or drive recycle gas for the gas recovery system. Example embodiments of the present disclosure integrate secondary recovery of a primary product, for example from a standalone membrane, for recycling to a gas source (e.g., a hydrocarbon enriched stream) and/or to a $CO_2$ plant (e.g., a $CO_2$ enriched stream). Example embodiments of the present disclosure provide for a zero emission system.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Before the present disclosure is described in further detail, it is to be understood that the disclosure is not limited to the particular embodiments described. It is also understood that the terminology used herein is for the purpose of describing particular embodiments only, and is not intended to be limiting. The scope of the present disclosure will be limited only by the claims. As used herein, the singular forms "a", "an", and "the" include plural embodiments unless the context clearly dictates otherwise.

In this application, unless otherwise clear from context, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) the terms "about" and "approximately" are used as equivalents and may be understood to permit standard variation as would be understood by those of ordinary skill in the art; and (v) where ranges are provided, endpoints are included.

Composition: as used herein, may be used to refer to a discrete physical entity that comprises one or more specified components. In general, unless otherwise specified, a composition may be of any form—e.g., gas, gel, liquid, solid, etc. In some embodiments, "composition" may refer to a combination of two or more entities for use in a single embodiment or as part of the same article. It is not required in all embodiments that the combination of entities result in physical admixture, that is, combination as separate co-entities of each of the components of the composition is possible; however many practitioners in the field may find it advantageous to prepare a composition that is an admixture of two or more of the ingredients in a pharmaceutically acceptable carrier, diluent, or excipient, making it possible to administer the component ingredients of the combination at the same time.

Improve, increase, or reduce: as used herein or grammatical equivalents thereof, indicate values that are relative to a baseline measurement, such as a measurement in a similar composition made according to previously known methods.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

Embodiments herein provide for systems, procedures, and/or apparatuses for providing recovered process streams for renewable natural gas recovery and/or upgrading. Aspects of the present disclosure reference "natural gas" for clarity of the description. The term "natural gas" should be understood broadly, and includes renewable natural gas, landfill gas, fossil fuel natural gas, gas from biodigesters, and the like. Example recovered process streams include, without limitation, improved natural gas recovery (e.g., volume, composition, and/or recovery cost), secondary natural gas recovery, and/or carbon dioxide product recovery. In certain embodiments, example systems, procedures, and/or apparatuses for renewable natural gas recovery are applicable to any type of natural gas stream, and/or gas stream including typical natural gas constituents (e.g., low carbon count hydrocarbons, such as methane, ethane, propane, butane, etc.) as a major portion thereof, including for example processing of landfill gases, or any other type of gases, such as biogas, coming from certain food waste streams, farm product streams, manure sources, waste treatment plants, wineries, and/or any facility having organic waste associated therewith. Example and non-limiting product streams for embodiments herein include, without limitation, one or more of a primary natural gas stream, a secondary natural gas stream, and/or a carbon dioxide stream. In certain embodiments, a product stream, as utilized herein, may be provided as an explicit product stream (e.g., provided to an external system, such as a natural gas pipeline, etc.), utilized internally (e.g., in a burner, as a constituent supply stream, for in-situ electricity generation, etc.), stored for later delivery and/or utilization, etc. The description herein referencing a product stream should be understood broadly, where a product stream includes any stream that has been processed herein and is ready for utilization or further processing for a purpose. Throughout this disclosure, the terms carbon dioxide and $CO_2$ are used interchangeably.

The description herein referencing certain streams as a permeate stream and/or a retentate stream are non-limiting examples for clarity of the present description. The number and arrangement of membranes, streams, and the like, is dependent upon the constituents of various streams, the characteristics of the membranes utilized (e.g., selectivity, permeability to various constituents being separated, operating pressures, etc.), system pressures, temperatures, and/or flow rates, or the like. The description herein referencing certain streams as product streams, permeate streams, retentate streams, intermediate streams, recycle streams, recovery streams, or the like, are non-limiting examples provided for clarity of the present description. Arrangements depicted herein, including arrangements described herein and/or consistent with descriptions herein, are non-limiting examples, and can be adjusted as described herein and/or as understood to one of skill in the art having the benefit of the present disclosure, and further such arrangements are not limited to naming conventions utilized herein.

Gas separation and purification processes may be used to maximize the value of carbon dioxide ($CO_2$) capture and/or recovery at renewable natural gas (RNG) facilities and organic waste processing facilities, such as landfills and biodigesters. Disclosed herein are systems, apparatus, and methods that enable the capture of $CO_2$ from organic waste. The disclosed systems, apparatus, and methods may also enable the conversion of captured $CO_2$ into a usable form.

Systems depicted herein are depicted schematically, and depicted components thereof may be omitted and/or an omitted component may be added and/or substituted. For example, components to implement and/or adjust stream order and/or connection points (e.g., valves and/or manifolds) may be added, omitted, and/or substituted to implement described flow arrangements. In another example, pressurization components (e.g., a pump) may be added, for example to ensure desired flow rates and/or operating pressures are maintained, and/or depicted pressurization components may be omitted if they are not needed to support the desired flow rates and/or operating pressures for a particular embodiment.

It can be seen that embodiments herein can be configured for zero emissions, or stated differently, the source gas may be completely separated into a hydrocarbon product stream and a $CO_2$ product stream, with no significant mass vented from the system as a purge gas, effluent, or the like. In certain embodiments, for example where some components are removed in conditioning steps (e.g., $H_2S$, water, volatile organic compounds, etc.), a zero emission embodiment is one where the entire remainder of the source gas after the conditioning is separated into a hydrocarbon product stream and a $CO_2$ product stream, with no significant mass vented from the system. It will be understood that the embodiments herein provide for numerous benefits to gas recovery systems, and systems with zero emissions or with non-zero emissions are contemplated herein.

Selection of components, stream arrangements, or the like, for embodiments herein may be selected or implemented based on a number of factors, such as the existing biogas upgrading process being employed, the purity and/or cleanliness of the inlet gas (e.g., presence of trace compounds, contaminants, the product fraction of the inlet gas including natural gas and/or $CO_2$), the volume of methane and/or carbon dioxide that can potentially be re-captured, the intended utilization (e.g., on-site vs. shipping off-site), a comparison of grid electricity costs vs. using the methane to produce electricity on-site, the need or ability to use the electricity for non-$CO_2$ related uses, if returned methane (and/or natural gas) is desired as an outcome of the process, to meet one or more emissions requirements or comply with a policy, a capital expenditure associated with methane utilization, available space and/or infrastructure for new and/or upgraded equipment, a potential amount of revenue generated through renewable identification numbers (RINs) or other government incentive, an available transportation equipment, supply and demand for a given market, or the like.

Figure 1:
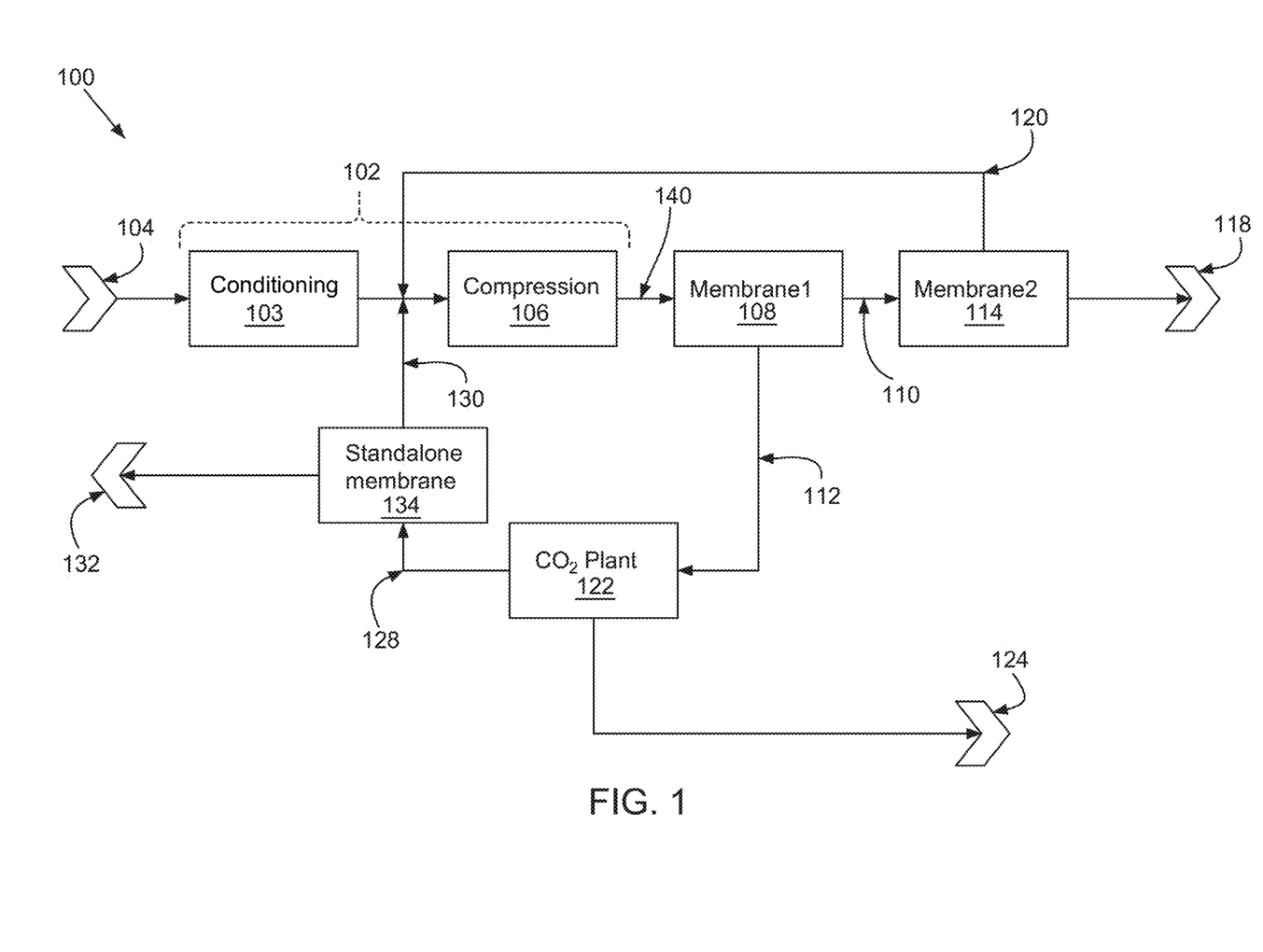
FIG. 1 depicts an example gas recovery system.

Referring now to FIG. 1, a stand-alone membrane may be used to recover methane from the non-condensable stream of a $CO_2$ plant and, in some examples, the hydrocarbon-enriched recycle stream from the $CO_2$ plant back to the conditioning/compression portion of the process is at a higher average pressure than the recycle stream from the second membrane back to the conditioning/compression steps. The example gas recovery system 100 may include "n" membranes, where "n" is 1 to 3, and in some examples, may be more than 3. Permeate may be passed to the $CO_2$ plant from any of the "n" membranes, specifically including the $3^{rd}$ membrane, the standalone membrane assembly 134 on the non-condensable side of the $CO_2$ plant (as shown here). Examples of a gas recovery system 100 include a source gas conditioning assembly 102 fluidly coupled to an inlet source gas 104, and configured to condition 103 and compress 106 the inlet source gas 104 to provide a conditioned source gas 140. The example gas recovery system 100 also includes a first membrane assembly 108 fluidly coupled to the conditioned source gas 140, and configured to separate the conditioned source gas 140 into a hydrocarbon-enriched stream 110 and a recovery stream 112. The example gas recovery system 100 a second membrane assembly 114 fluidly coupled to the hydrocarbon enriched stream, and configured to separate the hydrocarbon enriched stream 110 into a hydrocarbon product stream 118 and a recycle stream 120. The example gas recovery system 100 further includes a carbon dioxide ($CO_2$) plant assembly 122 fluidly coupled to the recovery stream 112, and configured to provide a carbon dioxide product stream 124 and an enriched recycle stream 128. The example gas recovery system 100 further includes a standalone membrane assembly 134 fluidly coupled to the enriched recycle stream 128, and configured to separate the enriched recycle stream 128 into a hydrocarbon-enriched recycle stream 130 and an effluent stream 132. In examples of the gas recovery system 100, the source gas conditioning assembly 102 is fluidly coupled to the recycle stream 120 and the hydrocarbon-enriched recycle stream 130.

In examples of the gas recovery system 100, the hydrocarbon enriched recycle stream 130 includes a retentate of a standalone membrane of the standalone membrane assembly 134. The source gas conditioning assembly 102 includes a first fluid coupling to the hydrocarbon-enriched recycle stream 130 and a second fluid coupling to the recycle stream 120, and wherein the first fluid coupling is downstream of the second fluid coupling. In some examples, the first fluid coupling includes a higher average pressure position than the second fluid coupling. In some examples, the first fluid coupling is downstream of a compressor component 106 of the source gas conditioning assembly 102. In some examples, the recycle stream 120 includes a permeate of a second membrane of the second membrane assembly 114. In some examples, the recovery stream 112 includes a permeate of a first membrane of the first membrane assembly 108. In some examples, the enriched recycle stream 128 includes non-condensable gases from the $CO_2$ plant assembly 122. The enriched recycle stream 128 passes directly from the $CO_2$ plant assembly 122 to the standalone membrane assembly 134 without being pressurized. In some examples, the $CO_2$ plant assembly 122 includes a carbon adsorption bed, a gas compression component, a gas dehydration component, and a liquefaction component.

A method of treating gas includes conditioning and compressing an inlet source gas to provide a conditioned source gas, separating the conditioned source gas into a hydrocarbon-enriched stream and a recovery stream, optionally with a first membrane assembly, and separating the hydrocarbon-enriched stream into a hydrocarbon product stream and a recycle stream, optionally with a second membrane assembly. The method for treating gas also includes processing the recovery stream, such as with a carbon dioxide ($CO_2$) plant assembly, to provide a carbon dioxide product stream and an enriched recycle stream. The method for treating gas also includes separating the enriched recycle stream into a hydrocarbon-enriched recycle stream and an effluent stream, optionally with a standalone membrane assembly. In examples of the method, the hydrocarbon-enriched recycle stream includes a retentate of a standalone membrane of the standalone membrane assembly. In examples of the method, the recycle stream includes a permeate of a second membrane of the second membrane assembly. In examples of the method, the recovery stream includes a permeate of a first membrane of the first membrane assembly. In examples of the method, the enriched recycle stream includes non-condensable gases from the $CO_2$ plant assembly, and in some examples, the enriched recycle stream passes directly from the $CO_2$ plant assembly to the standalone membrane assembly without being pressurized.

Figure 2:
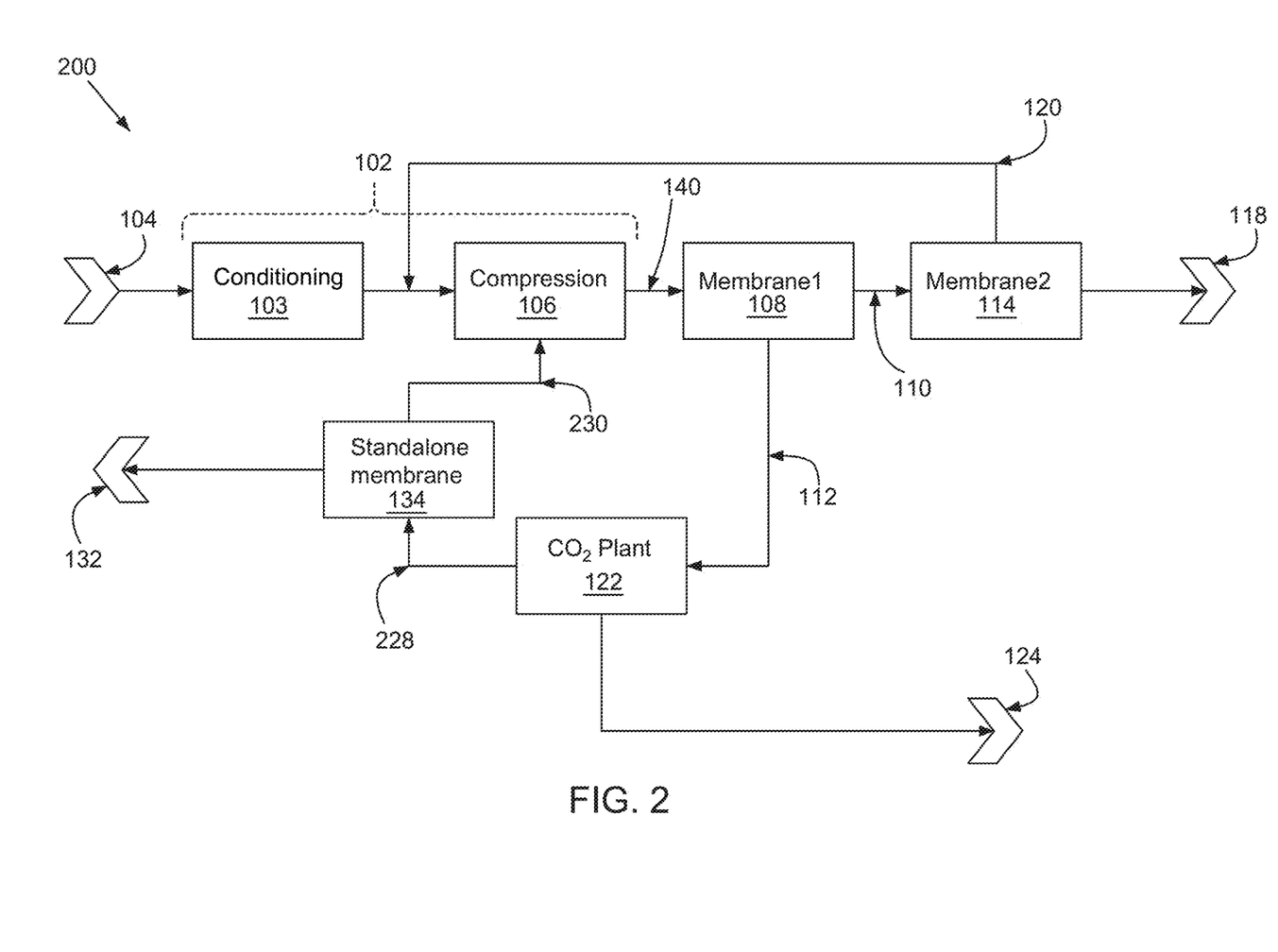
FIG. 2 depicts an example gas recovery system.

Referring to FIG. 2, examples of an apparatus 200 include a standalone membrane assembly 134 configured to receive a treated waste gas stream 228, the treated waste gas stream 228 comprising a purge stream of a $CO_2$ plant assembly 122, separate the treated waste gas stream 228 into a hydrocarbon enriched stream 230 and an effluent stream 132, and provide the hydrocarbon enriched stream 230 to a waste gas recovery facility (e.g., a facility including all or a portion of the apparatus 200), wherein the hydrocarbon enriched stream 230 is recycled to a position upstream of the $CO_2$ plant assembly 122. The hydrocarbon enriched stream 230 includes a retentate stream of a standalone membrane of the standalone membrane assembly 134.

Figure 3:
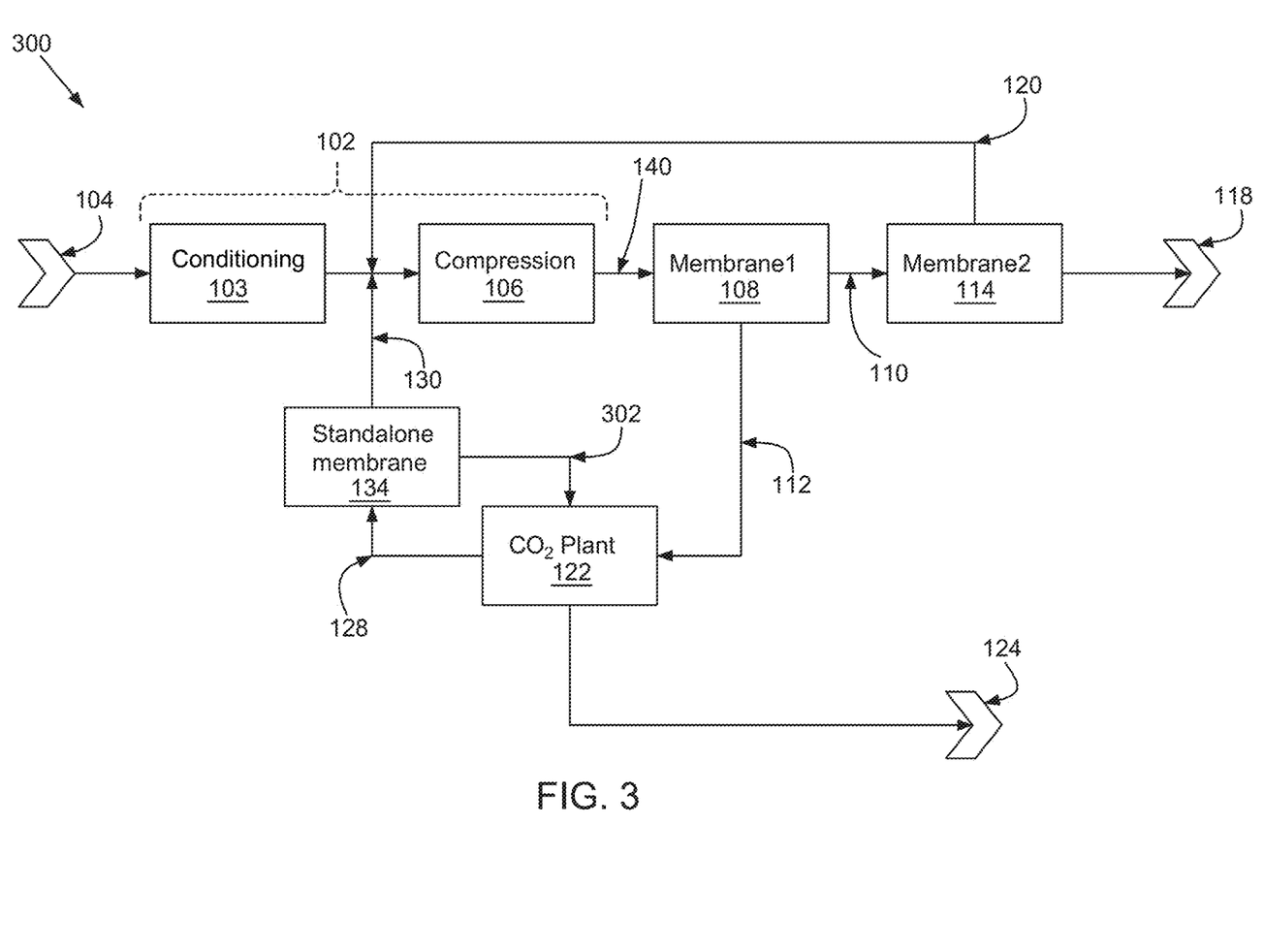
FIG. 3 depicts an example gas recovery system.

Referring now to FIG. 3, a stand-alone membrane may be used to recover both $CH_4$ and $CO_2$ from the non-condensable stream of the $CO_2$ plant, and in some examples, $CH_4$ is returned to the RNG plant. Examples of a gas recovery system 300 include a source gas conditioning assembly 102 fluidly coupled to an inlet source gas 104, and configured to condition 103 and compress 106 the inlet source gas 104 to provide a conditioned source gas 140. The example gas recovery system 300 also includes a first membrane assembly 108 fluidly coupled to the conditioned source gas 140, and configured to separate the conditioned source gas 140 into a hydrocarbon enriched stream 110 and a recovery stream 112. The example gas recovery system 300 also includes a second membrane assembly 114 fluidly coupled to the hydrocarbon enriched stream 110, and configured to separate the hydrocarbon enriched stream 110 into a hydrocarbon product stream 118 and a recycle stream 120. The example gas recovery system 300 also includes a carbon dioxide ($CO_2$) plant assembly 122 fluidly coupled to the recovery stream 112, and configured to provide a carbon dioxide product stream 124 and an enriched recycle stream 128. The example gas recovery system 300 also includes a standalone membrane assembly 134 fluidly coupled to the enriched recycle stream 128, and configured to separate the enriched recycle stream 128 into a hydrocarbon-enriched recycle stream 130 and a secondary recovery stream 302. In examples of the gas recovery system 300, the source gas conditioning assembly 102 is fluidly coupled to the recycle stream 120 and the hydrocarbon-enriched recycle stream 130, and the $CO_2$ plant assembly 122 is fluidly coupled to the secondary recovery stream 302. In examples of the gas recovery system 300, the hydrocarbon-enriched recycle stream 130 includes a retentate of a standalone membrane of the standalone membrane assembly 134. The source gas conditioning assembly 102 includes a first fluid coupling to the hydrocarbon-enriched recycle stream and a second fluid coupling to the recycle stream, and wherein the first fluid coupling is downstream of the second fluid coupling. The first fluid coupling includes a higher average pressure position than the second fluid coupling. The first fluid coupling is downstream of a compressor component of the source gas conditioning assembly.

An example apparatus includes a standalone membrane assembly 134 configured to receive a treated waste gas stream including a purge stream of a $CO_2$ plant assembly 122, separate the treated waste gas stream into a hydrocarbon-enriched stream 130 and a secondary recovery stream 302, provide the hydrocarbon-enriched stream 130 to a waste gas recovery facility, wherein the hydrocarbon-enriched stream 130 is recycled to a position upstream of the $CO_2$ plant assembly 122, and provide the secondary recovery stream 302 to the $CO_2$ plant assembly 122. The hydrocarbon-enriched stream 130 includes a retentate stream of a standalone membrane of the standalone membrane assembly 134.

A method of treating gas includes conditioning and compressing an inlet source gas to provide a conditioned source gas, separating the conditioned source gas into a hydrocarbon-enriched stream and a recovery stream optionally with a first membrane assembly, and separating the hydrocarbon-enriched stream into a hydrocarbon product stream and a recycle stream optionally with a second membrane assembly. The method further includes providing a carbon dioxide product stream and an enriched recycle stream optionally with a carbon dioxide ($CO_2$) plant assembly. The method further includes separating the enriched recycle stream into a hydrocarbon-enriched recycle stream and a secondary recovery stream optionally with a standalone membrane assembly.

Figure 4:
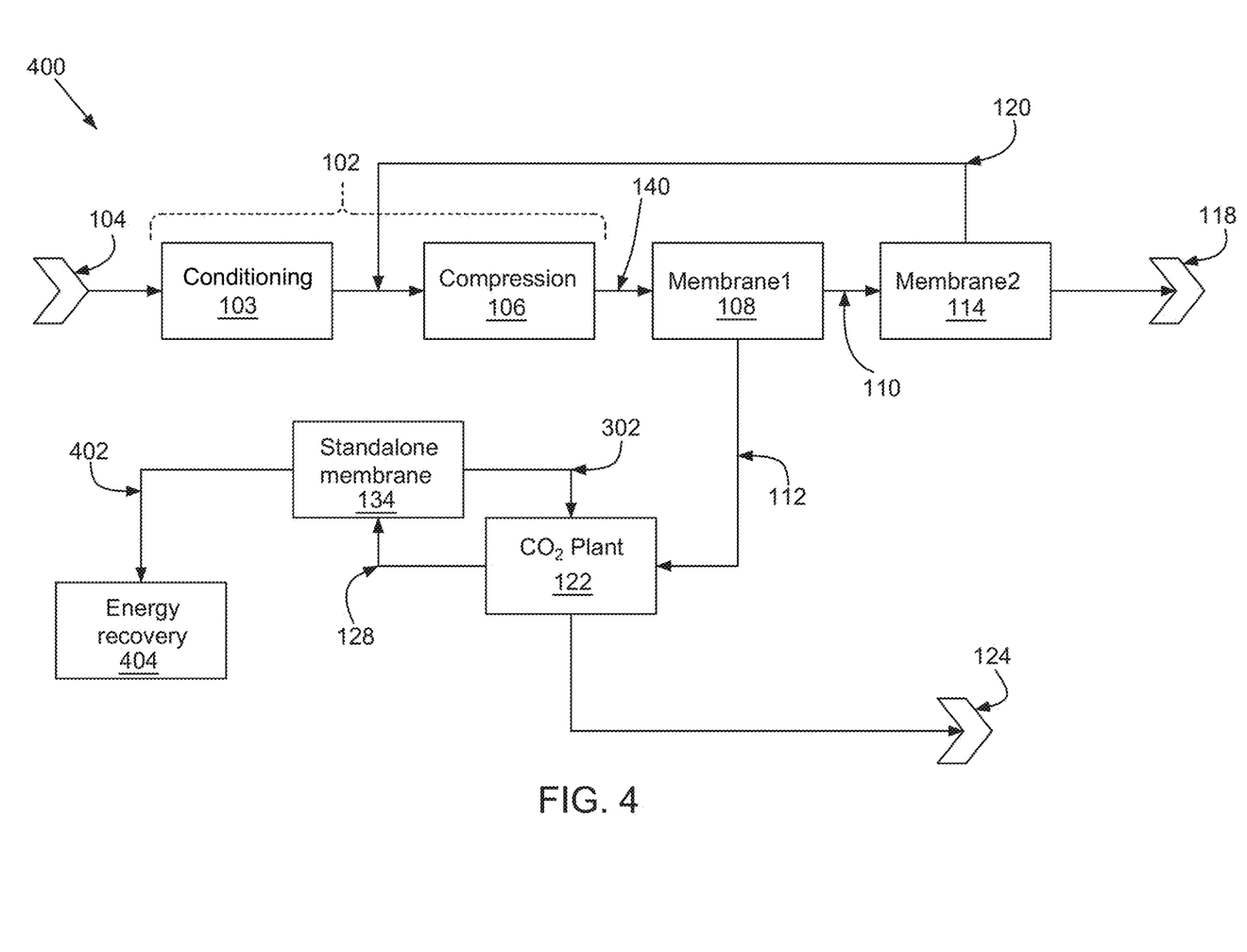
FIG. 4 depicts an example gas recovery system.

Referring now to FIG. 4, a stand-alone membrane may be used to recover $CH_4$ from the non-condensable stream of the $CO_2$ plant, and $CH_4$ may be used mainly for other on-site uses. An example gas recovery system 400 includes a source gas conditioning assembly 102 fluidly coupled to an inlet source gas 104, and configured to condition 103 and compress 106 the inlet source gas 104 to provide a conditioned source gas 140. The example gas recovery system 400 includes a first membrane assembly fluidly coupled to the conditioned source gas 140, and configured to separate the conditioned source gas 140 into a hydrocarbon-enriched stream 110 and a recovery stream 112. The example gas recovery system 400 includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 400 includes a carbon dioxide ($CO_2$) plant assembly 122 fluidly coupled to the recovery stream 112, and configured to provide a carbon dioxide product stream 124 and an enriched recycle stream 128. The example gas recovery system 400 includes a standalone membrane assembly 134 fluidly coupled to the enriched recycle stream 128, and configured to separate the enriched recycle stream 128 into a hydrocarbon-enriched recycle stream 402 and a secondary recovery stream 302. The example gas recovery system 400 includes an energy recovery assembly 404 fluidly coupled to the hydrocarbon-enriched recycle stream 402 and configured to extract energy therefrom. The source gas conditioning assembly 102 is fluidly coupled to the recycle stream 120, and the $CO_2$ plant assembly 122 is fluidly coupled to the secondary recovery stream 302. In examples, the energy recovery assembly 404 includes a burner, a fuel cell, or a generator.

An example apparatus includes a standalone membrane assembly 134 configured to receive a treated waste gas stream, the treated waste gas stream including a purge stream of a $CO_2$ plant assembly 122, separate the treated waste gas stream into a hydrocarbon-enriched stream 402 and a secondary recovery stream 302, provide the hydrocarbon-enriched stream 402 to an energy recovery assembly 404, and provide the secondary recovery stream 302 to the $CO_2$ plant assembly 122.

An example method of treating gas includes conditioning and compressing the inlet source gas to provide a conditioned source gas, separating the conditioned source gas into a hydrocarbon-enriched stream and a recovery stream optionally with a first membrane assembly, and separating the hydrocarbon-enriched stream into a hydrocarbon product stream and a recycle stream optionally with a second membrane assembly. The example method may further include providing a carbon dioxide product stream and an enriched recycle stream optionally with a carbon dioxide ($CO_2$) plant assembly. The example method may further include separating the enriched recycle stream into a hydrocarbon-enriched recycle stream and a secondary recovery stream optionally with a standalone membrane assembly. The example method may further include extracting energy from the hydrocarbon-enriched recycle stream optionally with an energy recovery assembly.

Figure 5:
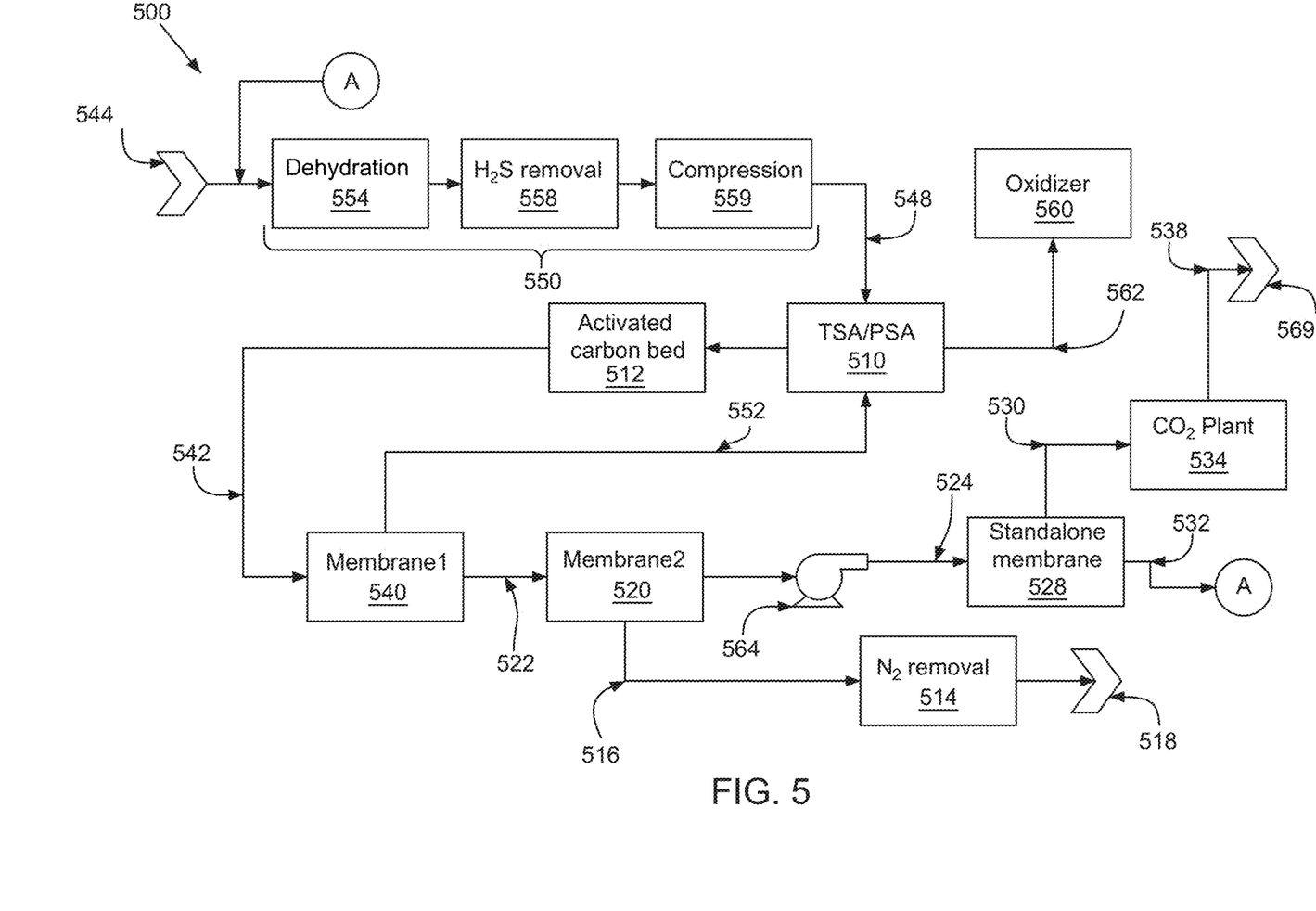
FIG. 5 depicts an example gas recovery system.

Referring now to FIG. 5, a stand-alone membrane may be used to capture permeate from a $2^{nd}$ stage membrane, recycling $CH_4$ to an RNG plant and $CO_2$ to a $CO_2$ plant. An example gas recovery system 500 includes a source gas conditioning assembly 550 fluidly coupled to an inlet source gas 544, and configured to condition the inlet source gas 544 to provide a conditioned source gas 548. The example gas recovery system 500 also includes an adsorption assembly 510 fluidly coupled to the conditioned source gas 548, and configured to provide a scrubbed source gas 542, the adsorption assembly 510 including at least one of a temperature swing adsorber or a pressure swing adsorber. The example gas recovery system 500 also includes a first membrane assembly 540 fluidly coupled to the scrubbed source gas 542, and configured to separate the scrubbed source gas 542 into a hydrocarbon enriched stream 522 and a flush stream 552. The example gas recovery system 500 a second membrane assembly 520 fluidly coupled to the hydrocarbon-enriched stream 522, and configured to separate the hydrocarbon enriched stream 522 into a hydrocarbon product stream 516 and a recovery stream 524. The example gas recovery system 500 a standalone membrane assembly 528 fluidly coupled to the recovery stream 524, and configured to separate the recovery stream 524 into a carbon dioxide ($CO_2$) enriched stream 530 and a recycle stream 532. The example gas recovery system 500 a $CO_2$ plant assembly 534 fluidly coupled to the $CO_2$ enriched stream 530, and configured to provide a carbon dioxide product stream 538. The adsorption assembly 510 is at least selectively fluidly coupled to the flush stream 552, and configured to utilize the flush stream 552 for regeneration operations. The source gas conditioning assembly 550 is fluidly coupled to the recycle stream 532. In examples, the adsorption assembly 510 further includes an activated carbon bed component 512. In examples, the example gas recovery system 500 further includes a nitrogen removal assembly 514 fluidly interposed between the hydrocarbon product stream 516 and a final hydrocarbon product stream 518. In examples, the source gas conditioning assembly 550 is further configured to condition the inlet source gas 544 by dehydrating 554 the inlet source gas 544. In examples, the source gas conditioning assembly 550 is further configured to condition the inlet source gas 544 by removing sulfur 558 from the inlet source gas 544. In examples, the example gas recovery system 500 includes an energy recovery assembly fluidly coupled to a flush gas outlet 562 of the adsorption assembly 510, and configured to extract energy from the flush stream 552. In examples, the example gas recovery system 500 further includes a thermal oxidizer 560 coupled to a flush gas outlet 562 of the adsorption assembly 510, and configured to treat the flush stream 552. In examples, the $CO_2$ plant assembly 534 is further configured to provide a secondary recovery stream 569, including for energy recovery, venting, or further processing with a standalone membrane. In examples, the example gas recovery system 500 includes an energy recovery assembly (not shown) fluidly coupled to the secondary recovery stream 569. In examples, the source gas conditioning assembly 550 is fluidly coupled to the secondary recovery stream 569. It should be understood that "A" from the standalone membrane assembly 528 can return anywhere in the source gas conditioning assembly 550, including before or after the compression step 559. The example of FIG. 5 includes a pump 564, or other pressurizing component, for example to provide sufficient operating pressure to the recovery stream 524 to operate the standalone membrane assembly 528 (e.g., where the recovery stream 524 is a permeate of the second membrane assembly 520.

An example apparatus includes a standalone membrane assembly 528 configured to receive a recovery stream 524 including a residual from separating a hydrocarbon-enriched stream 522 from a conditioned source gas 548, separate the recovery stream 524 into a carbon dioxide ($CO_2$) enriched stream 530 and a recycle stream 532, provide the $CO_2$ enriched stream 530 to a $CO_2$ plant assembly 534, and provide the recycle stream 532 to a source gas conditioning assembly 550, wherein the recycle stream 532 is recycled to a position upstream of the $CO_2$ plant assembly 534. The recycle stream 532 includes a retentate stream of a standalone membrane of the standalone membrane assembly 528.

A method of treating gas includes conditioning an inlet source gas to provide a conditioned source gas, processing the conditioned source gas at an adsorption assembly to provide a scrubbed source gas, separating the scrubbed source gas into a hydrocarbon enriched stream and a flush stream, separating the hydrocarbon-enriched stream into a hydrocarbon product stream and a recovery stream, separating the recovery stream into a carbon dioxide ($CO_2$) enriched stream and a recycle stream, and processing the $CO_2$ enriched stream at a $CO_2$ plant assembly to provide a carbon dioxide product stream.

Figure 6:
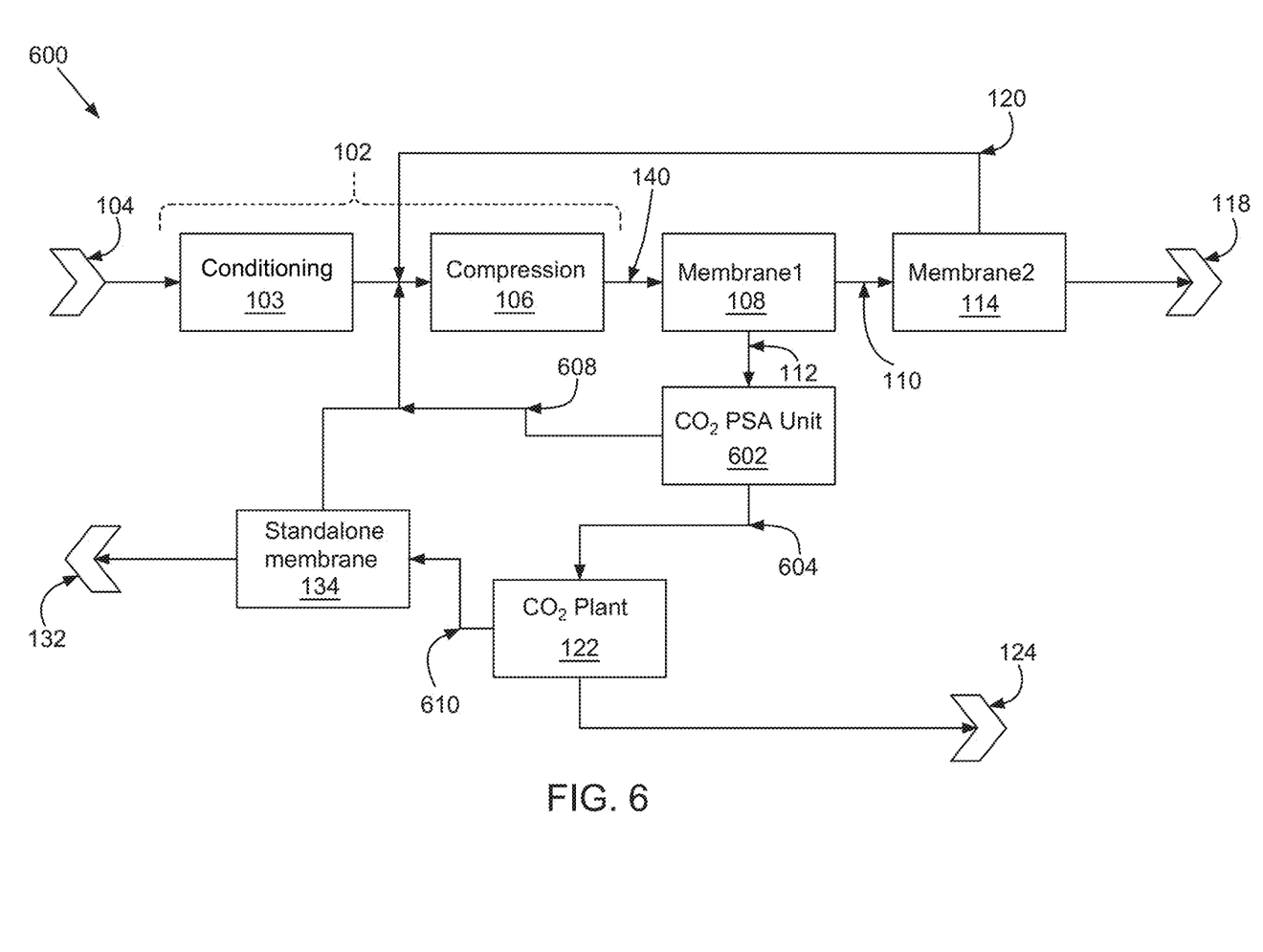
FIG. 6 depicts an example gas recovery system.

Referring now to FIG. 6, $CO_2$ PSA technology along with a $CO_2$ Plant/standalone membrane (SAM) can be used to recover $CO_2$ and $CH_4$ slip. An example gas recovery system 600 includes a source gas conditioning assembly 102 fluidly coupled to an inlet source gas 104, and configured to condition 103 and compress 106 the inlet source gas 104 to provide a conditioned source gas 140. The example gas recovery system 600 also includes a first membrane assembly 108 fluidly coupled to the conditioned source gas 140, and configured to separate the conditioned source gas 140 into a hydrocarbon-enriched stream 110 and a recovery stream 112. The example gas recovery system 600 also includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 600 also includes a $CO_2$ adsorption assembly 602 fluidly coupled to the recovery stream 112, and configured to separate the recovery stream 112 into an enriched recovery stream 608 and a $CO_2$ enriched stream 604. The example gas recovery system 600 also includes a carbon dioxide ($CO_2$) plant assembly 122 fluidly coupled to the $CO_2$ enriched stream 604, and configured to provide a carbon dioxide product stream 124 and a second enriched recovery stream 610. The example gas recovery system 600 also includes a standalone membrane assembly 134 fluidly coupled to the second enriched recovery stream 610, and configured to separate the second enriched recovery stream 610 into a hydrocarbon enriched recycle stream and an effluent stream 132. In examples, the source gas conditioning assembly is fluidly coupled to the recycle stream and the hydrocarbon-enriched recycle stream 130. In examples, the source gas conditioning assembly 102 is fluidly coupled to the enriched recovery stream 610. In examples, the $CO_2$ plant is fluidly coupled to the effluent stream 132.

A method of treating gas includes conditioning and compressing an inlet source gas to provide a conditioned source gas, separating the conditioned source gas into a hydrocarbon enriched stream and a recovery stream, separating the hydrocarbon enriched stream into a hydrocarbon product stream and a recycle stream, separating the recovery stream into an enriched recovery stream and a $CO_2$ enriched stream, processing the $CO_2$ enriched stream at a carbon dioxide ($CO_2$) plant assembly to provide a carbon dioxide product stream and an enriched recovery stream, and separating the enriched recovery stream into a hydrocarbon enriched recycle stream and an effluent stream.

Figure 7:
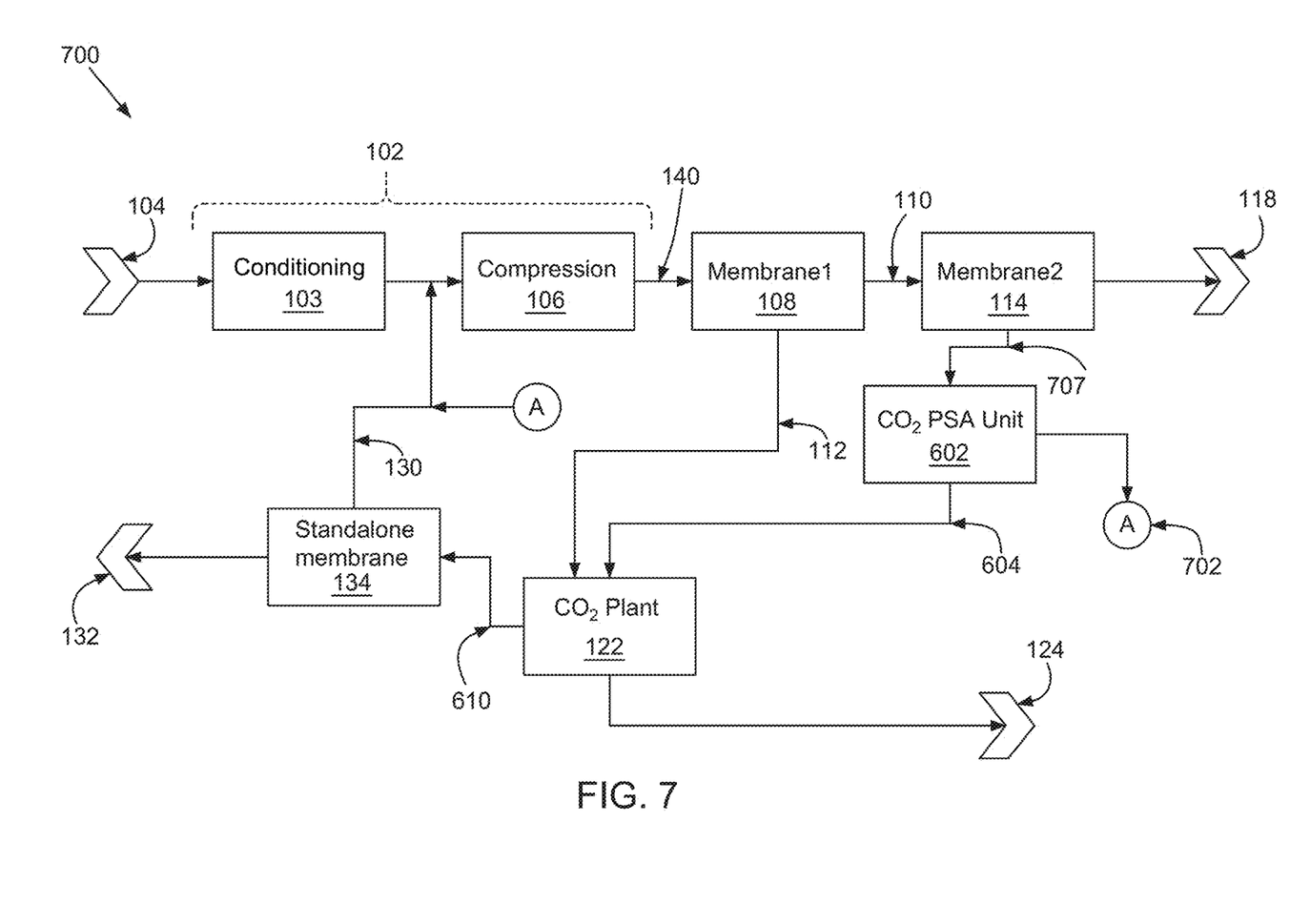
FIG. 7 depicts an example gas recovery system.

Referring now to FIG. 7, an example gas recovery system 700 includes a source gas conditioning assembly 102 fluidly coupled to an inlet source gas 104, and configured to condition 103 and compress 106 the inlet source gas 104 to provide a conditioned source gas 140. The example gas recovery system 700 includes a first membrane assembly 108 fluidly coupled to the conditioned source gas 140, and configured to separate the conditioned source gas 140 into a hydrocarbon-enriched stream 110 and a recovery stream 112. The example gas recovery system 700 includes a second membrane assembly 114 fluidly coupled to the hydrocarbon-enriched stream 110, and configured to separate the hydrocarbon-enriched stream 110 into a hydrocarbon product stream 118 and a second recovery stream 707. The example gas recovery system 700 includes a $CO_2$ adsorption assembly 602 fluidly coupled to the second recovery stream 707, and configured to separate the second recovery stream 707 into an enriched recycle stream 702 and a $CO_2$ enriched stream 604. The example gas recovery system 700 includes a carbon dioxide ($CO_2$) plant assembly 122 fluidly coupled to the recovery stream 112 and the $CO_2$ enriched stream, and configured to provide a carbon dioxide product stream 124 and an enriched recovery stream 610. The example gas recovery system 700 includes a standalone membrane assembly 134 fluidly coupled to the enriched recovery stream 610, and configured to separate the enriched recovery stream 610 into a hydrocarbon enriched recycle stream 130 and an effluent stream 132. The source gas conditioning assembly 102 is fluidly coupled to the enriched recycle stream 702 and the hydrocarbon enriched recycle stream 130. In examples, the example gas recovery system 700 includes an energy recovery assembly (not shown) fluidly coupled to the hydrocarbon enriched recycle stream 130. In examples, the $CO_2$ plant is fluidly coupled to the effluent stream.

A method of treating gas includes conditioning and compressing an inlet source gas to provide a conditioned source gas, separating the conditioned source gas into a hydrocarbon-enriched stream and a recovery stream, separating the hydrocarbon-enriched stream into a hydrocarbon product stream and a recycle stream, providing a carbon dioxide product stream and an enriched recovery stream optionally via a carbon dioxide ($CO_2$) plant assembly, separating the recycle stream into an enriched recycle stream and a $CO_2$ enriched stream, and separating the enriched recovery stream into a hydrocarbon enriched recycle stream and an effluent stream, optionally via a standalone membrane assembly.

Figure 8:
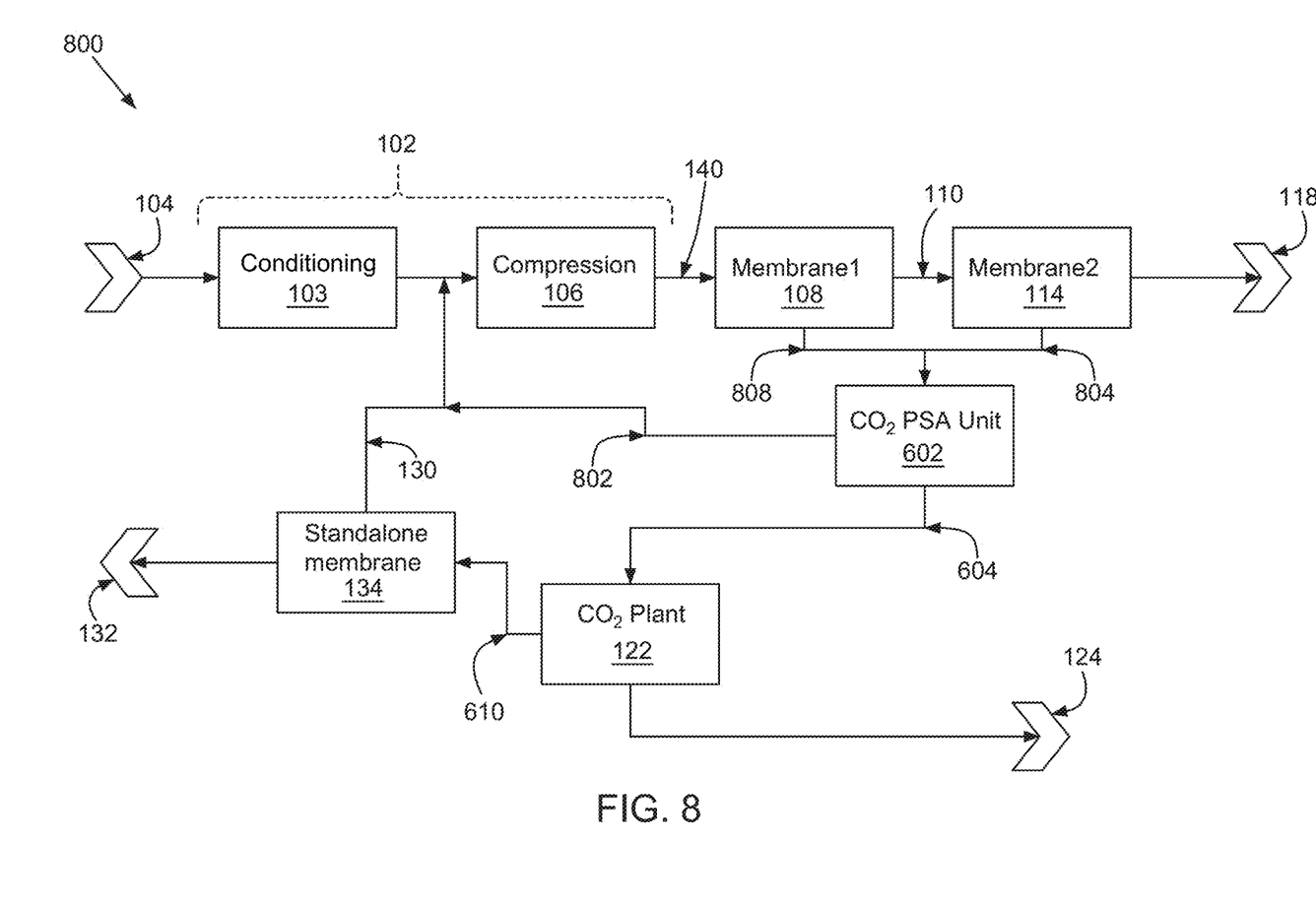
FIG. 8 depicts an example gas recovery system.

Referring now to FIG. 8, an example gas recovery system 800 includes a source gas conditioning assembly 102 fluidly coupled to an inlet source gas 104, and configured to condition 103 and compress 106 the inlet source gas 104 to provide a conditioned source gas 140. The example gas recovery system 800 includes a first membrane assembly 108 fluidly coupled to the conditioned source gas 140, and configured to separate the conditioned source gas 140 into a hydrocarbon-enriched stream 110 and a first recovery stream 808. The example gas recovery system 800 includes a second membrane assembly 114 fluidly coupled to the hydrocarbon-enriched stream 110, and configured to separate the hydrocarbon-enriched stream 110 into a hydrocarbon product stream 118 and a second recovery stream 804. The example gas recovery system 800 includes a $CO_2$ adsorption assembly 602 fluidly coupled to the first recovery stream 808 and the second recovery stream 804, and configured to provide an enriched recycle stream 802 and a $CO_2$ enriched stream 604. The example gas recovery system 800 includes a carbon dioxide ($CO_2$) plant assembly 122 fluidly coupled to the $CO_2$ enriched stream 604, and configured to provide a carbon dioxide product stream 124 and an enriched recovery stream 610, The example gas recovery system 800 includes a standalone membrane assembly 134 fluidly coupled to the enriched recovery stream 610, and configured to separate the enriched recovery stream 610 into a hydrocarbon-enriched recycle stream 130 and an effluent stream 132. The source gas conditioning assembly 102 is fluidly coupled to the enriched recycle stream 802 and the hydrocarbon enriched recycle stream 130. In examples, the $CO_2$ plant is fluidly coupled to the effluent stream.

An example method includes conditioning and compressing an inlet source gas to provide a conditioned source gas, separating the conditioned source gas into a hydrocarbon-enriched stream and a first recovery stream, separating the hydrocarbon-enriched stream into a hydrocarbon product stream and a second recovery stream, providing an enriched recycle stream and a $CO_2$ enriched stream optionally with a $CO_2$ adsorption assembly, providing a carbon dioxide product stream and an enriched recovery stream optionally with a carbon dioxide ($CO_2$) plant assembly, and separating the enriched recycle stream into a hydrocarbon-enriched recycle stream and an effluent stream optionally with a standalone membrane assembly.

Figure 9:
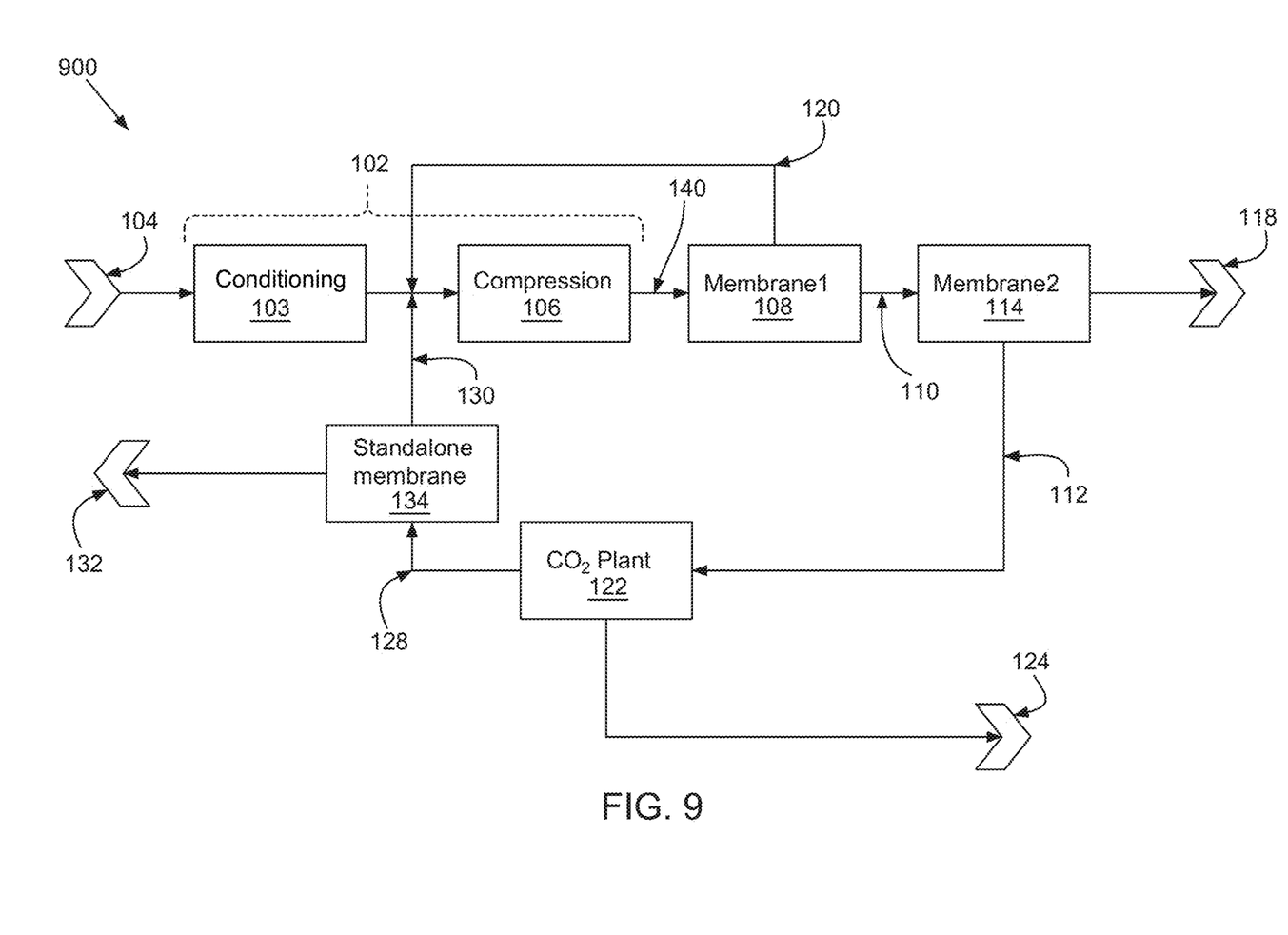
FIG. 9 depicts an example gas recovery system.

Referring now to FIG. 9, an example gas recovery system 900 is shown where recovery occurs at a second membrane assembly 114 and recycle occurs at a first membrane assembly 108. The example gas recovery system 900 includes a source gas conditioning assembly 102 fluidly coupled to an inlet source gas 104, and configured to condition 103 and compress 106 the inlet source gas 104 to provide a conditioned source gas 140. The example gas recovery system 900 includes a first membrane assembly 108 fluidly coupled to the conditioned source gas 140, and configured to separate the conditioned source gas 140 into a hydrocarbon enriched stream 110 and a recycle stream 120. The example gas recovery system 900 includes a second membrane assembly 114 fluidly coupled to the hydrocarbon enriched stream 110, and configured to separate the hydrocarbon enriched stream 110 into a hydrocarbon product stream 118 and a recovery stream 112. example gas recovery system 900 includes a carbon dioxide ($CO_2$) plant assembly 122 fluidly coupled to the recovery stream 112, and configured to provide a carbon dioxide product stream 124 and an enriched recycle stream 128. example gas recovery system 900 includes a standalone membrane assembly 134 fluidly coupled to the enriched recycle stream 128, and configured to separate the enriched recycle stream 128 into a hydrocarbon enriched recycle stream 130 and an effluent stream 132, wherein the source gas conditioning assembly 102 is fluidly coupled to the recycle stream 120 and the hydrocarbon enriched recycle stream 130. The hydrocarbon enriched recycle stream 130 comprises a retentate of a standalone membrane of the standalone membrane assembly 134. The source gas conditioning assembly 102 comprises a first fluid coupling to the hydrocarbon enriched recycle stream 130 and a second fluid coupling to the recycle stream 120, wherein the first fluid coupling is downstream of the second fluid coupling. The first fluid coupling comprises a higher average pressure position than the second fluid coupling. The first fluid coupling is downstream of a compressor component 106 of the source gas conditioning assembly. The recycle stream includes a permeate of a first membrane of the first membrane assembly 108. The recovery stream comprises a permeate of a first membrane of the second membrane assembly 114. The enriched recycle stream 128 includes non-condensable gases from the $CO_2$ plant assembly 122. The enriched recycle stream 128 passes directly from the $CO_2$ plant assembly 122 to the standalone membrane assembly 134 without being pressurized. The $CO_2$ plant assembly 122 includes a carbon adsorption bed, a gas compression component, a gas dehydration component, and a liquefaction component.

A method of treating gas may include conditioning and compressing an inlet source gas to provide a conditioned source gas, separating the conditioned source gas into a hydrocarbon enriched stream and a recycle stream, separating the hydrocarbon enriched stream into a hydrocarbon product stream and a recovery stream, providing a carbon dioxide product stream and an enriched recycle stream optionally via a carbon dioxide ($CO_2$) plant assembly fluidly coupled to the recovery stream, and separating the enriched recycle stream into a hydrocarbon enriched recycle stream and an effluent stream optionally via a standalone membrane assembly fluidly coupled to the enriched recycle stream.

An example 2-stage renewable natural gas (RNG) upgrading process is described following, which may be embodied in whole or part by embodiments throughout the present disclosure. The depicted process utilizes a two-stage membrane system, such as is used in biodigesters such as dairy waste digesters, food waste digesters, poultry processing plants, wastewater treatment plants, or the like. A biogas inlet stream from a digester is received, for example as a source gas. The process includes a purification and gas conditioning component, for example removing certain gas constituents (e.g., $H_2S$, sulfur, volatile organic compounds, etc.), dehydration, pressurization, or the like. The biogas is compressed after which it moves through two stages of membranes. The selected pressures and temperature of the outlet biogas may be configured according to the membrane components utilized, which will be understood to the person of skill in the art having the benefit of the present disclosure and information ordinarily available when contemplating a particular system, for example such information including: the composition of the biogas, the desired separation efficiency and/or degree of separation, membrane characteristics, subsequent treatment for the retentate, and/or subsequent treatment for the permeate. The membranes may be hollow fiber membranes or any other suitable, at least partially permeable technology, and may exhibit durability, such as having a lifespan on the order of years (e.g., 3 to 10 years) and selectivity for desired molecules/compounds and/or molecule/compound sizes. Material that passes through the membrane, due to its size or other characteristic, may be known as permeate, while material that does not pass through the membrane, and is therefore retained within the system, may be known as retentate. The retentate may collect at an annulus of the membrane, depending upon the physical configuration of the membrane system, and may be removed from the annulus. Gas flow through the membrane may be in the direction of the hollow fibers. In practice, the membrane may be situated within a system, such as in a pipe, where headers for gas distribution and collection may be on either side of the membrane. The example system is a two-stage membrane system, but may include three membranes, with recycle locations (e.g., gases recycled to be combined with the source gas) selected from any of the three membranes, and/or recovery locations (e.g., gases provided to a $CO_2$ plant for $CO_2$ recovery) from any one or two of the three membranes. In certain embodiments, a single membrane system provides a hydrocarbon product stream directly, and a separate recovery stream that is provided to a $CO_2$ plant, which may be ultimately recycled (e.g., as a non-condensable stream from the $CO_2$ plant assembly, to a standalone membrane, with the hydrocarbon enriched portion of the standalone membrane separation being recycled).

The example system includes a highly purified methane ($CH_4$) slip stream return via a standalone membrane unit. The depicted process includes returning excess methane slip that has been removed as part of the $CO_2$ plant liquefaction process to the RNG producer at high purity to ensure maximum value creation and emission reduction at the site. The return of the methane at high purity improves the process efficiency of the biogas upgrading equipment. The methane slip is purified with a standalone membrane unit as part of the $CO_2$ recovery process enabling both the recycling of methane with the recovery of $CO_2$ for potentially revenue-generating end uses. This enables the RNG producer to achieve essentially 100% methane capture and use. The effluent stream (e.g., the permeate, where the retentate is recycled) may be vented, have an energy capture operation (e.g., oxidizing any remaining hydrocarbons and/or operating a fuel cell) performed on it, and/or recycled to the $CO_2$ plant to further extract any remaining $CO_2$. The permeate may have a high fraction of $CO_2$, such as 90% or greater.

An example $CO_2$ plant includes one or more of: polishing of raw $CO_2$ with carbon beds (e.g., to remove VOC's and sulfur), other gas conditioning processes, $CO_2$ compression (e.g., to 300 psi), liquid removal (e.g., drying to −70 degrees F. (−56 degrees C.)), cooling (e.g., using a refrigerant, cooling to ~−25 degrees centigrade), liquefaction (e.g., in a stripper column), or non-condensable gas (e.g., methane, oxygen, nitrogen) removal from the stripper column. The $CO_2$ plant may produce purified liquid $CO_2$ from a re-boiler, such as a purity of greater than 99.9%. In some embodiments, the purified $CO_2$ is directed to storage tanks, and/or otherwise passed into a $CO_2$ utilization and/or storage system. In addition to providing higher recovery of methane and capture of $CO_2$ that would otherwise be vented, and at high purity, example systems herein further reduce the operating cost of the RNG plant (e.g., to support higher recycle rates), and increase the capacity of the RNG plant (e.g., allowing a greater portion of the steady state flow through the system to be realized as product stream, e.g., due to the lower recycle rates).

The non-condensable gases from the $CO_2$ plant, also known as purge gas, which may be a mixture of $CO_2$ and $CH_4$, such as a +/−25% $CH_4$, 75% $CO_2$ mixture, may be removed from a stripper column of the $CO_2$ plant at high pressure (e.g., 18 bar, 300 psi). The purge gas may be recycled to the source gas, but the purge gas pressure may need to be let down. In certain embodiments, the purge gas is directed to a standalone membrane, where the elevated pressure effectively operates the standalone membrane, potentially with no additional pressurization. The utilization of the standalone membrane results in greater recovery of $CH_4$ using less input energy to the process since waste purge stream pressure, also known as waste compression energy, from the $CO_2$ plant is recovered and used to drive the stand-alone membrane unit to separate $CO_2$ and methane. Recovery of this waste purge stream pressure enables a more economical recovery of purified, commercially usable, methane. By leveraging the waste pressure of the purge stream, no additional energy needs to be added to the methane slip stream to process the stream through the standalone membrane unit. The pressure available in the waste stream, which is typically wasted, is utilized to further purify the overall waste stream into high purity streams: a high pressure $CH_4$ stream (e.g., the retentate), and a low pressure $CO_2$ stream (e.g., the permeate). This high pressure, high purity $CH_4$ stream can be used for many commercial purposes, such as injection into pipeline, use as an on-site fuel, use in a fuel cell, re-injected into the RNG upgrading process (e.g., at the front end, before compression, after compression, between the first and second stage membranes, etc.), use in a combined heat and power (CHP) system, or the like. In one example, the retentate from the stand-alone membrane unit is returned to the RNG inlet to be combined with the source gas.

Non-condensable gases purged from the $CO_2$ plant that are not processed through the stand-alone membrane unit may not be suitable to be returned to the process with the conditioned source gas, but may be returned upstream of conditioning components before recycling, and/or may be vented. The retentate may have a variable composition, such as 98% $CH_4$/2% $CO_2$, 90% $CH_4$/10% $CO_2$, 85% $CH_4$/15% $CO_2$, or the like. In embodiments, the composition may be selectable based on a number of factors, such as the size of the membrane, the pressure of the purge gas stream, the temperature of the purge gas stream, the quality of the biogas inlet stream, or the like. In some embodiments, there may be a waste stream of $CO_2$ or non-condensables from the stand-alone membrane unit.

Another example 2-stage renewable natural gas (RNG) upgrading process is described following. The example process includes passing the low pressure $CO_2$ stream from a standalone membrane back to the $CO_2$ plant as a recycle, improving the overall $CO_2$ recovery of the system. The low pressure $CO_2$ stream from the standalone membrane may have a significant $CO_2$ fraction (e.g., 90% or greater), and can significantly increase $CO_2$ recovery with the recycle to the $CO_2$ plant. In the example system, both methane and carbon dioxide may be recovered at high rates, such as nearly or equal to 100%, during the RNG upgrading process. In some embodiments, the pressure of the membrane may be varied to achieve specific outcomes for $CH_4$ and $CO_2$ recovery. For example, the pressure on the stand-alone membrane may be optimized to achieve a particular level of methane and/or carbon dioxide suitable for a particular intended use or application, and/or to balance stream flow rates, recycle rates, or the like to achieve the desired recovery fraction.

In certain embodiments, the utilization of an additional recycle of the membrane permeate to the $CO_2$ plant enhances the overall $CO_2$ recovery of the system. The amount of additional $CO_2$ recovery depends upon several variables in the system, including the purity of the $CO_2$ feedgas (the membrane permeate to the $CO_2$ plant). An example system having a 97% $CO_2$ purity will result in about 10% additional $CO_2$ recovery. Another example system having an 88% $CO_2$ purity will result in about 42% additional $CO_2$ recovery. The actual amount of additional $CO_2$ recovery for a given system will depend on a number of factors, for example the temperatures of streams in the system, the pressure drop across various separation membranes, and/or the properties of various separation membranes. The utilization of the additional recycle of the membrane permeate to the $CO_2$ plant may enhance operations of the $CO_2$ plant, for example by increasing the average $CO_2$ purity of streams being processed by the $CO_2$ plant. The utilization of the additional recycle of the membrane permeate to the $CO_2$ plant allows for manipulation of energy usage and/or sub-assembly capability of various parts of the overall system, the membrane units, thereby allowing the system to be adapted to the composition of feedgas and the priorities for the system (e.g., operational costs, capital costs, energy costs, maintenance costs, etc.).

Another example 2-stage renewable natural gas (RNG) upgrading process is described following. The example process involves a two-stage membrane system such as is used in biodigesters such as dairy waste digesters, food waste digesters, poultry processing plants, wastewater treatment plants, or the like. The example process includes a highly purified methane ($CH_4$) slip stream via a standalone membrane unit, which is passed to an energy recovery device. The energy recovery device may be a fuel cell (e.g., operating on methane), a burner, an oxidizer, a generator (e.g., driven by the thermal, chemical, and/or mechanical residual energy in the slip stream), and/or any other energy recovery device. The permeate from the standalone membrane may be recaptured and directed back to the $CO_2$ plant, and/or may be vented. In certain embodiments, the permeate from the standalone membrane may be utilized as a flush gas, for example where a temperature and/or pressure swing adsorber component is included as a conditioning component for the source gas.

Another example RNG upgrading process is described following. In certain embodiments, a system of the process includes an adsorption component to condition the source gas, for example to remove volatile organic compounds (VOCs) from the source gas before application to membrane separation. Adsorption components often utilize a pressure swing and/or temperature swing operation to switch between capture and regenerate operating modes, periodically purging the captured VOCs (or other constituents) using a flush gas. In certain embodiments, multiple VOC components may be operated in parallel, for example allowing components to regenerate the adsorber without requiring a shutdown of operations. The example RNG upgrading process includes utilization of a stream as flush gas for the VOC component of the source gas conditioning, for example a permeate stream of the first membrane, and/or a permeate stream of the second membrane.

A further example RNG upgrading process includes landfill gas (LFG) entering the process as an inlet stream, is dehydrated, and hydrogen sulfide (H2S) is removed. The stream is directed to a thermal or pressure swing absorption vessel (TSA/PSA) to remove VOC content and any trace siloxane, after which the stream proceeds to activated carbon beds for further polishing and is then directed to a first stage membrane, and then a second stage membrane to remove $CO_2$, oxygen, and nitrogen. In some embodiments, the stream from the TSA/PSA during flush operations is directed to a thermal oxidizer (TOX). In some embodiments, the $1^{st}$ stage membrane permeate is directed back to flush the TSA/PSA and then is directed to the TOX. In some embodiments, the second stage membrane permeate is returned to the RNG inlet before dehydration. The retentate from the second stage membrane is directed to a nitrogen removal component and provided as a hydrocarbon product stream, leaving the system. In certain embodiments, finishing operations for the hydrocarbon product stream, such as an N2 removal operation, may be a part of the system (e.g., hydrocarbon product stream is ready for a pipeline or other system), or not a part of the system (e.g., hydrocarbon product stream is ready for a finishing operation).

Another example RNG upgrading process is described following. An example system of the process includes a $CO_2$ PSA/TSA/VPSA adsorption component that processes a recovery stream from one of the membranes, for example a permeate of the first membrane and/or a permeate of the second membrane. The example $CO_2$ PSA/TSA/VPSA adsorption component generates a $CO_2$ enriched stream that is relatively pure $CO_2$ (97% purity or higher), and which is then fed to a $CO_2$ plant. A tail gas stream from $CO_2$ PSA/TSA/VPSA adsorption component is an enriched hydrocarbon stream (e.g., +/-15 to 25%) that can be used for other purposes, and/or recycled into the source gas for the RNG upgrading process. PSA/TSA/VPSA references Pressure Swing Adsorption technology (PSA), Temperature Swing Adsorption technology (TSA), Vacuum Pressure Swing Adsorption technology (VPSA), or a combination of these technologies used together.

By increasing the purity of the $CO_2$ inlet stream to the $CO_2$ plant, removal of $CO_2$ from the stripper column, can be increased from, for instance, 60% to 95% of the available $CO_2$, thereby reducing the capital expenses required for $CO_2$ capture and processing, and significantly decreasing the required specific energy (kWh per ton of finished product).

In certain embodiments, the permeate from the first membrane is passed to the $CO_2$ PSA/TSA/VPSA adsorption component, which generates a $CO_2$ enriched stream that is passed to the $CO_2$ plant, and the permeate from the second membrane is recycled to the source gas. In certain embodiments, the permeate from the first membrane is passed to the $CO_2$ plant, and the permeate from the second membrane is passed to a $CO_2$ PSA/TSA/VPSA adsorption component, which generates a $CO_2$ enriched stream that is passed to the $CO_2$ plant. In certain embodiments the permeate from both membranes is passed to the $CO_2$ PSA/TSA/VPSA adsorption component, which generates a $CO_2$ enriched stream that is passed to the $CO_2$ plant. Any one or more of the foregoing examples includes a standalone membrane, for example operating on a non-condensable stream from the $CO_2$ plant, that provides a hydrocarbon enriched stream (e.g., for recycle to the source gas, utilization for energy recovery, treatment with an oxidizer, vented, etc.), and an effluent stream that may be recycled (e.g., to the $CO_2$ plant), vented, or the like. An example permeate from the $2^{nd}$ stage membrane is +/-50% $CO_2$ (and roughly 45% $CH_4$). An example $CO_2$ PSA/TSA/VPSA adsorption component generates a relatively pure $CO_2$ (e.g., 97% purity or higher) stream and a tail gas stream that is enriched in $CH_4$ (e.g., +/-60 to 70%), which may be recycled to the source gas. Due to the fact that significant volumes of $CO_2$ have already been removed from the permeate stream via the PSA/TSA/VPSA technology, the volume to be re-processed by the RNG upgrading system is up to 50% lower, thereby freeing up throughput capacity in the compression and membrane configuration, saving in the required capital costs of the RNG upgrading system, and also saving on operating costs of the RNG upgrading system (e.g., compression costs are reduced by +/−15%).

A further example includes the permeate from the 1st stage membrane, which is usually vented to atmosphere, optionally combined with the product stream from the PSA/TSA/VPSA system and sent to the $CO_2$ plant assembly 122 for recovery of the $CO_2$ and $CH_4$ slip. Although this will somewhat dilute the purity of the combined product stream going to the $CO_2$ plant, it will enable the capture of virtually all of the $CO_2$ from biogas stream, as well as all of the $CH_4$ stream.

Another example RNG upgrading process for a landfill gas is schematically depicted. An example system for the RNG upgrading process includes conditioning of a source gas, including dehydration, $H_2S$ removal, compression, and/or VOC removal using a TSA/PSA component. The example system includes providing a permeate of the first membrane to a $CO_2$ PSA/TSA/VPSA adsorption component, which provides a $CO_2$ stream to a $CO_2$ plant, and which utilizes the tail gas for a recycle to the source gas, provides the tail gas to an energy recovery assembly, and/or vents the tail gas. The example system includes recycling a second membrane permeate to the source gas, and/or recycling non-condensable gas from the $CO_2$ plant to the source gas. In the example system, an alternative gas (e.g., compressed air and/or nitrogen) may be utilized as a flush gas for the TSA/PSA component. In an alternate arrangement, the permeate from the first membrane may be utilized as a flush gas for the TSA/PSA component, and/or be passed as a feed gas to a $CO_2$ PSA/TSA/VPSA adsorption component, whether alternatively (e.g., the permeate provided as the flush gas, or as the feed gas for the $CO_2$ PSA/TSA/VPSA adsorption component), additionally (provided to both, with flush gas as needed), and/or in serial (e.g., all or a portion of the permeate is utilized to flush the TSA/PSA component, which is then passed on to the $CO_2$ PSA/TSA/VPSA adsorption component). An example system includes a standalone membrane that treats the non-condensable stream from the $CO_2$ plant, recycling and/or otherwise utilizing a hydrocarbon enriched portion, and venting or recycling to the $CO_2$ plant and/or to the $CO_2$ PSA/TSA/VPSA adsorption component a remainder portion (e.g., $CO_2$ enriched). In a further example, a permeate from the second membrane may be utilized as a recycle to the source gas, and/or provided as a feed gas for the $CO_2$ PSA/TSA/VPSA adsorption component. In a further example, a retentate from the second membrane may be utilized as a hydrocarbon product stream.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

Example and illustrative embodiments are set forth herein to provide a clear description of aspects of the present disclosure. Methods described herein may be embodied, in whole or part, in systems that perform the steps thereof, and may be distributed across devices in a number of ways, or all of the functionality may be integrated into a dedicated, standalone device, or other hardware. Components of systems set forth herein may be arranged in a number of ways to achieve goals as set forth herein, and/or to achieve other goals that are evident from the disclosure herein. All such permutations and combinations are intended to fall within the scope of the present disclosure.

The invention claimed is:

1. A carbon dioxide recovery system, comprising:
   a primary recovery system comprising a plurality of membranes;
   a carbon dioxide ($CO_2$) plant assembly fluidly coupled to a permeate of a membrane of the plurality of membranes, the $CO_2$ plant assembly configured to provide a liquid $CO_2$ product stream and a non-condensable stream; and
   a standalone membrane assembly fluidly coupled to the non-condensable stream, and configured to separate the non-condensable stream into a hydrocarbon enriched stream and a $CO_2$ enriched stream, wherein the $CO_2$ plant assembly is fluidly coupled to the $CO_2$ enriched stream.

2. The carbon dioxide recovery system of claim 1, wherein the membrane of the plurality of membranes comprises a first sequential membrane.

3. The carbon dioxide recovery system of claim 1, wherein the membrane of the plurality of membranes comprises a second sequential membrane.

4. The carbon dioxide recovery system of claim 1, further comprising:
   wherein the primary recovery system comprises an adsorption component; and
   wherein the adsorption component is at least selectively coupled to the $CO_2$ enriched stream as a flush gas.

5. The carbon dioxide recovery system of claim 1, further comprising:
   wherein the primary recovery system is fluidly coupled to the hydrocarbon enriched stream as a recycle gas.

6. The carbon dioxide recovery system of claim 1, wherein the non-condensable stream is not pressurized between the $CO_2$ plant assembly and the standalone membrane assembly.

* * * * *